Nov. 5, 1957
G. R. ADAMS
2,812,129
SUCTION PUMP
Filed May 15, 1956
2 Sheets-Sheet 1
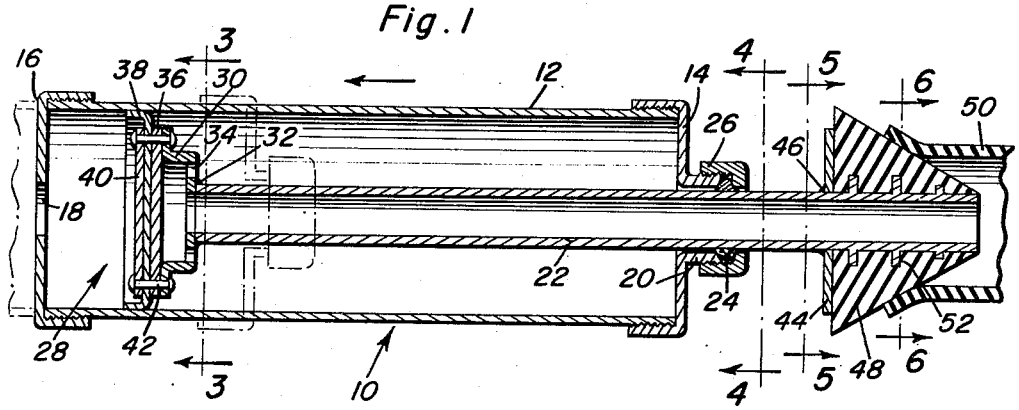
Fig. 1
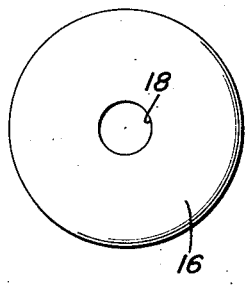
Fig. 2
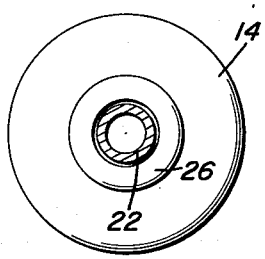
Fig. 4
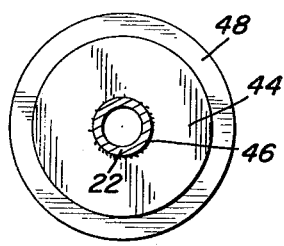
Fig. 5
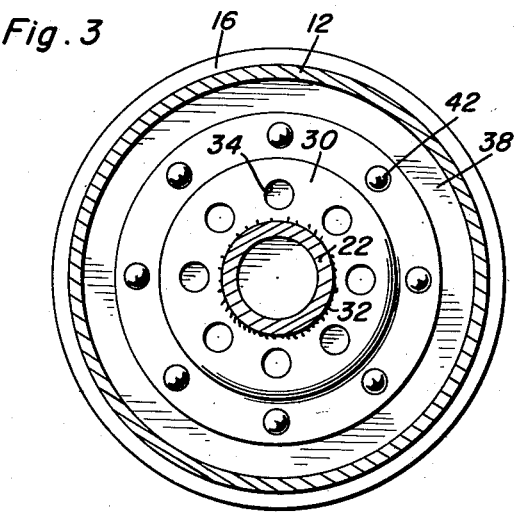
Fig. 3
Fig. 6
George R. Adams
INVENTOR.
BY *[signatures]*
Attorneys Nov. 5, 1957  G. R. ADAMS  2,812,129
SUCTION PUMP
Filed May 15, 1956  2 Sheets-Sheet 2
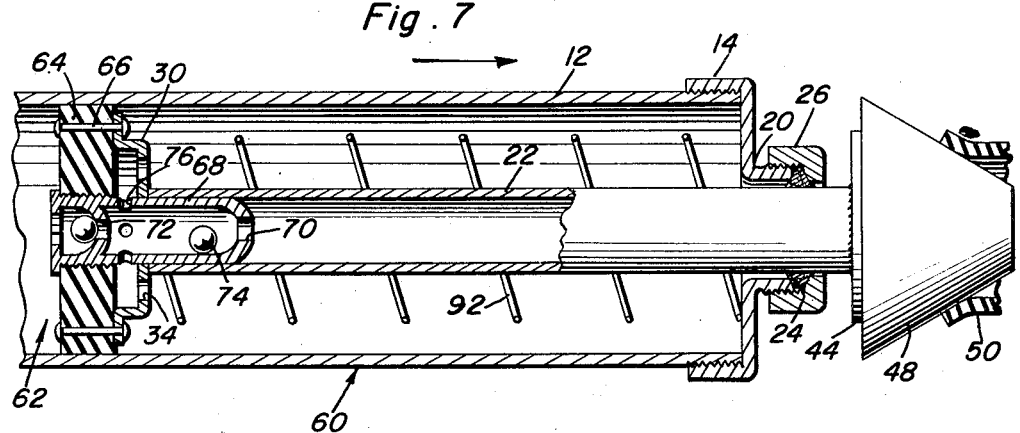
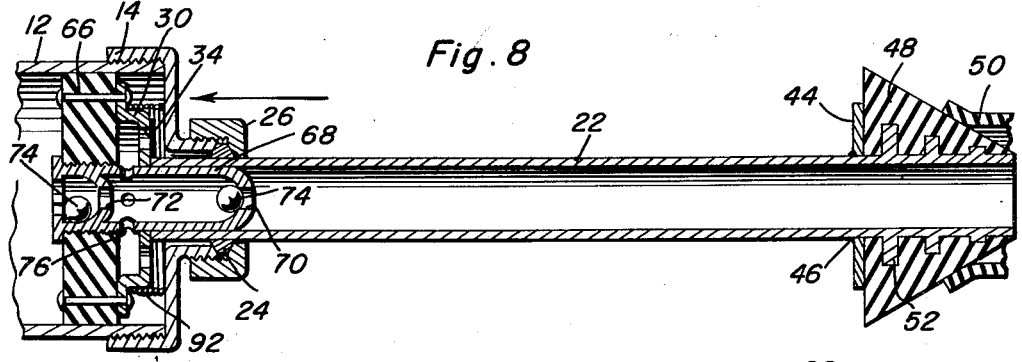
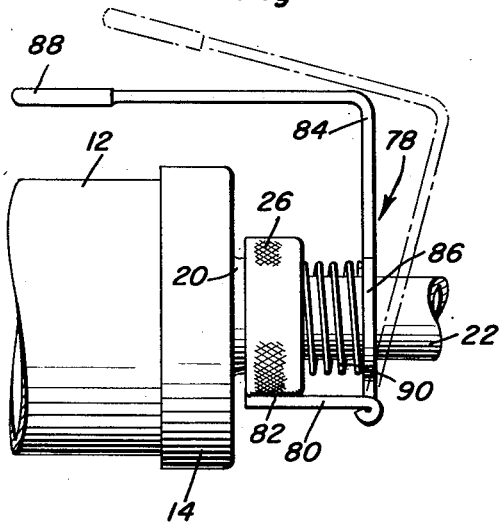
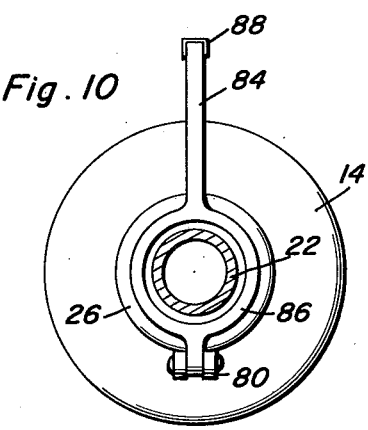
George R. Adams
INVENTOR.

United States Patent Office 2,812,129
Patented Nov. 5, 1957

2,812,129

SUCTION PUMP

George R. Adams, Primrose, Nebr.

Application May 15, 1956, Serial No. 584,930

3 Claims. (Cl. 230—174)

This invention generally relates to a suction pump and more particularly to a suction pump specifically designed for use in conjunction with irrigation systems for the purpose of inducing the flow of water through a siphon tube to transfer water from a water filled main ditch to the crop irrigated.

Heretofore, the siphoning action for transferring water from an irrigation ditch to the crop being irrigated has been accomplished by sucking the air from the siphon tube by employing the mouth. This operation is inefficient and also unsanitary inasmuch as the water in the siphon tube or the irrigation ditch may be contaminated. Accordingly, it is the primary object of the present invention to provide a portable suction pump for exhausting the air from a siphon tube for siphoning the water from the main irrigation ditch into branch ditches for irrigating a crop.

A further object of the present invention will reside in its simplicity of construction, ease of operation, adaptation for its particular purposes and its relatively inexpensive manufacturing cost.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a longitudinal, vertical sectional view of the suction pump of the present invention illustrating its relationship to the siphon tube;

Figure 2 is an end elevational view of the open end of the cylinder;

Figure 3 is an enlarged transverse sectional view taken substantially upon the plane passing along section line 3—3 of Figure 1 illustrating the construction of the tubular piston rod and the communicating apertures for communicating the piston rod with the interior of the cylinder;

Figure 4 is a transverse, vertical sectional view taken substantially upon the plane passing along section line 4—4 of Figure 1 illustrating the details of the closed end of the cylinder;

Figure 5 is a transverse sectional view taken substantially upon a plane passing along section line 5—5 of Figure 1 illustrating the manner of attaching the adapter to the end of the piston rod;

Figure 6 is a transverse, vertical sectional view taken substantially upon a plane passing along section line 6—6 of Figure 1 illustrating the relationship of the frustoconical adapter and the siphon tube;

Figure 7 is a partial longitudinal sectional view of a modified form of the suction pump illustrating the details of the valve mechanism for permitting reciprocation of the pump;

Figure 8 is a sectional view of the construction of Figure 7 illustrating the arrangement of the valve mechanism in the outward directional movement of the cylinder;

Figure 9 is a detailed side elevational view illustrating a locking arm provided for locking the piston and cylinder in orientated position; and Figure 10 is an end elevational view of the construction of Figure 9 illustrating the relationship of the locking member to the piston rod.

Referring now specifically to the drawings, the numeral 10 generally designates the suction pump of the present invention which includes an elongated cylinder 12 having a closure cap 14 at one end forming a closed end for the cylinder 12 and a cap 16 at the other end thereof having an aperture 18 communicating the outer end of the cylinder 12 with the atmosphere.

The cap 14 is provided with a central cylindrical member 20 slidably receiving an elongated tubular piston rod 22 and a packing member 24 is provided at the outer end of the cylindrical member 20 so that a packing nut 26 may be threaded onto the cylindrical member 20 for tightening the packing 24 into sealing engagement with the tubular piston rod 22.

The inner end of the piston rod 22 is provided with a piston generally designated by the numeral 28 which includes a cup-shaped plate 30 secured to the end of the piston rod 20 as by welding 32 wherein the cup-shaped plate 30 is provided with a series of apertures 34 spaced circumferentially on the plate 30 for communicating the interior of the piston rod 22 with the interior of the cylinder 12 between the piston 28 and the closed end cap 14. Forming a closure for the cup-shaped plate 30 is a cylindrical disk 36 and disposed against the outer face of the cylindrical disk is a cup-shaped gasket or sealing washer 38 with another circular disk 40 being disposed against the outer surface of the gasket 38 with all of the plates 30, 36, 40 and the gasket 38 being held in assembled relation by rivets 42 or any other suitable fastening means.

On the free end of the piston rod 22 is disposed a circular plate 44 secured thereto as by welding 46 which forms a backing plate for a frusto-conical member 48 of resilient material which is an adapter for insertion into the end of a siphon tube 50. The end of the adapter 48 terminates at the outer end of the piston rod 22 and the piston rod 22 is provided with a plurality of longitudinally spaced flanges 52 embedded in the resilient adapter 48 for securely mounting the adapter 48 on the piston rod 22. The resilient adapter 48 engaging the resilient siphon tube 50 forms a sealing engagement between the piston rod 22 and the interior of the siphon tube 50 whereby air exhausted from the siphon tube 50 will enter the interior of the cylinder 12 through the piston rod 22.

In operation, the piston 28 is moved towards the closed end formed by the cap 14 of the cylinder 12 and the adapter 48 is then inserted into the tube 50 and the cylinder 12 may then be moved inwardly which will reduce the pressure between the piston 28 and the closed end of the cylinder 12 thereby evacuating or creating a suction in the piston rod 22 and the siphon tube 50 for inducing water to flow from the main irrigation ditch to a branch ditch at a lower level for irrigating a crop.

Referring now specifically to Figures 7 and 8, it will be seen that the numeral 60 generally designates the modified form of suction pump which includes a majority of similar parts which are numbered with the same reference numerals. In this instance, a piston designated generally by the numeral 62 includes the cup-shaped member 30 and a disk of resilient material 64 secured to the cup-shaped member 30 by rivets 66. A tubular insert 68 extends through the disk of resilient material 64 and is inserted into the piston rod 22. The tubular insert 68 is provided with a pair of longitudinally spaced valve seats 70 and 72 associated with freely movable spherical balls 74. A plurality of radial apertures 76 are provided in the tubular insert 64 for communication with the interior of the cup-shaped plate 30 whereby the interior of the cylinder 12 may be selectively communicated with the piston rod 22 or the atmosphere thereby permitting reciprocation of the pump 60.

In operation of the device of Figures 7 and 8, movement of the cylinder 12 towards the adapter 48 causes an increase in the area behind the piston 62 thereby reducing the pressure in this area. The reduction in pressure will cause the outer ball 74 to engage the valve seat or opening 72 thereby closing the same and moving the valve ball 74 away from the opening 70 thereby communicating the interior of the cylinder with the piston rod 22 for creating a suction in the siphon tube 50. This orientation of the valve ball 74 is illustrated in Figure 7. When the direction of the cylinder 12 is reversed as illustrated in Figure 8, the pressure in the area between the piston 62 and the closed end of the cylinder 12 is increased which will force the ball valve 74 into engagement with the valve seat 70 and remove the ball valve 74 away from the valve seat 72 thereby communicating the interior of the cylinder 12 with the atomsphere and closing off the piston rod 22 whereby reciprocation of the cylinder 12 may be employed for increasing the siphoning action or suction on the siphon tube 50.

Figures 9 and 10 illustrate a locking device generally designated by the numeral 78 which includes a bracket 80 attached to the packing nut 26 as by welding 82 with an L-shaped arm or lever 84 pivotally attached to the free end thereof and including a circular portion 84 in surrounding relation to the piston rod 22 and a handle portion 88 lying alongside the cylinder 12 for movement of the locking member 84 against a compression coil spring 90 which normally urges the circular portion 86 into frictional locking engagement with the piston rod 22 for locking the piston and cylinder in a desired position. This prevents the cylinder 12 from sliding outwardly on the piston rod 22 after a push stroke of the cylinder 12 has been finished and this particular form of the invention is specifically adapted for use with a pump employing a coil spring for returning the cylinder to a position remote from the adapter 48 in preparation of another suction stroke.

This type of return coil spring is designated by numeral 92 in Figure 7 and serves to promptly return to piston to its initial position so that a subsequent working stroke or suction stroke may be carried out. Also, each of the freely movable spherical balls may be provided with small, light coil springs for holding the valves against the valves seats until such time as the suction or pressures in the device overcome the spring tension thereby opening the valves. This type of construction provides a more efficient and positive operation of the pump. These springs have not been illustrated since they do not alter the principles of the device.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A portable suction pump for siphoning liquid through a tube comprising a hollow piston rod having a front end adapted for attachment to a tube in sealing relation thereto, a hollow piston at the rear end of the piston rod having front and rear sides, a cylinder slidably mounted on said piston and having a front end slidably mounted on said hollow piston rod, said cylinder being movable forwardly of said hollow piston rod and piston, a cup member on the rear end of said hollow piston rod communicating therewith and attached to said piston in front thereof to connect said hollow piston rod and piston together and having an aperture therein communicating said cup member with said cylinder forwardly of said piston and whereby forward movement of said cylinder will create a suction in said cup member and said piston rod, and a closure cap on the rear end of the cylinder apertured to relieve back pressure in the cylinder behind the piston when the cylinder is moved forwardly.

2. A portable suction pump for siphoning liquid through a tube comprising an elongated hollow piston rod having a front end provided with an adapter for sealing engagement with a tube, a piston at the other end of said hollow piston rod having front and rear sides, a cylinder slidably mounted on said piston for movement forwardly and rearwardly thereof and including a closed front end with an aperture slidably receiving the hollow piston rod for sliding thereon in sealed relation thereto, a cup on the rear end of the hollow piston rod communicating therewith and attached thereto and to said front side of the piston to connect said hollow piston rod and piston together and provided with an aperture communicating the cup with the cylinder in front of the piston and whereby movement of the cylinder forwardly will create a suction in the cup and the hollow piston rod to siphon liquid through the tube.

3. The combination of claim 2, said cylinder having a rear end vented to atmosphere to relieve pressure behind the piston when the cylinder is moved forwardly, and a tubular insert extending through said piston and cap and into said hollow piston rod and opening into said cup and having normally opened valves in opposite ends thereof for communicating said ends of the insert with said tubular hollow shaft and with said cylinder behind the piston, said valves being closed in response to suction and pressure in said insert resulting from forward and rearward movement of said cylinder.

References Cited in the file of this patent

UNITED STATES PATENTS

| | | |
|---|---|---|
| 29,662 | Beadle | Aug. 21, 1860 |
| 526,175 | Barbour | Sept. 18, 1894 |
| 632,801 | Brooks | Sept. 12, 1899 |
| 790,051 | Halstead | May 16, 1905 |
| 963,528 | Dickinson | July 5, 1910 |
| 1,511,971 | Hunter | Oct. 24, 1924 |
| 1,844,979 | Rohe et al. | Feb. 16, 1932 |
| 2,129,415 | Fontenot | Sept. 6, 1938 |
| 2,498,359 | Coleman | Feb. 21, 1950 |
| 2,697,842 | Meyer | Dec. 28, 1954 |